(12) United States Patent
Waters, Jr. et al.

(10) Patent No.: US 10,619,884 B2
(45) Date of Patent: Apr. 14, 2020

(54) SECURITY FOR GRATE COVERING UNDERGROUND AIR VENTS

(71) Applicants: Louis A. Waters, Jr., Bellaire, TX (US); Nick Alan Eastman, Georgetown, TX (US)

(72) Inventors: Louis A. Waters, Jr., Bellaire, TX (US); Nick Alan Eastman, Georgetown, TX (US)

(73) Assignee: Floodbreak, L.L.C., Bellaire, TX (US)

( * ) Notice: Subject to any disclaimer, the term of this patent is extended or adjusted under 35 U.S.C. 154(b) by 173 days.

(21) Appl. No.: 15/796,785

(22) Filed: Oct. 28, 2017

(65) Prior Publication Data

US 2018/0119982 A1 May 3, 2018

Related U.S. Application Data

(60) Provisional application No. 62/414,114, filed on Oct. 28, 2016.

(51) Int. Cl.
*F24F 13/02* (2006.01)
*F16M 13/02* (2006.01)
(Continued)

(52) U.S. Cl.
CPC .......... *F24F 13/0245* (2013.01); *E04C 2/428* (2013.01); *E21F 1/06* (2013.01); *F16M 13/02* (2013.01); *F16M 13/022* (2013.01); *F24F 13/0209* (2013.01); *F24F 13/0254* (2013.01); *E04B 1/40* (2013.01); *E04H 9/145* (2013.01); *E05F 1/02* (2013.01); *E06B 2009/002* (2013.01); *E06B 2009/007* (2013.01); *E21F 1/04* (2013.01); *F16P 3/08* (2013.01); *Y10T 24/3489* (2015.01); *Y10T 24/44983* (2015.01); (Continued)

(58) Field of Classification Search
CPC ......... Y10T 29/49948; Y10T 29/49963; Y10T 24/3489; Y10T 24/44983; F16M 13/02; F16M 13/022; F16P 3/08; E21F 1/06; E21F 1/16; F24F 13/0209; F24F 13/0245; F24F 13/0254; A47F 5/0006; E04C 2/428; E04B 1/40
See application file for complete search history.

(56) References Cited

U.S. PATENT DOCUMENTS

| 1,707,533 A | * | 4/1929 | Nagin | ............. E04C 2/428 105/457 |
| 2016/0097212 A1 | * | 4/2016 | Waters, Jr. | ............. E05F 1/02 49/13 |

FOREIGN PATENT DOCUMENTS

| DE | 29611293 U1 | * | 9/1996 | ............. E04C 2/428 |
| EP | 0048574 A1 | * | 3/1982 | ............. E04C 2/428 |

(Continued)

*Primary Examiner* — Jermie E Cozart
(74) *Attorney, Agent, or Firm* — Tim L. Burgess, P.C.

(57) ABSTRACT

Apparatus and process for securing a grating over an atmospheric opening of a ventilation shaft fluidly communicating through the ventilation shaft to an underground ventilation duct. A vertically extending support for arrangement in the shaft has horizontal flanges for projecting across a top of at least two opposing sides of said shaft to hang said support in said shaft for over topping by said grating. An anchoring member is supported in the support at a level below the flanges and proximate the atmospheric opening. A hold-down connects to the anchoring member to secure the hold-down and the grating to the anchoring member.

18 Claims, 10 Drawing Sheets

(51) Int. Cl.
  *E04C 2/42*   (2006.01)
  *E21F 1/06*   (2006.01)
  *E21F 1/04*   (2006.01)
  *E04H 9/14*   (2006.01)
  *E06B 9/00*   (2006.01)
  *E05F 1/02*   (2006.01)
  *F16P 3/08*   (2006.01)
  *E04B 1/41*   (2006.01)

(52) U.S. Cl.
  CPC .... *Y10T 29/49948* (2015.01); *Y10T 29/49963* (2015.01)

(56) References Cited

FOREIGN PATENT DOCUMENTS

| | | | | |
|---|---|---|---|---|
| FR | 2382604 A1 | * | 9/1978 | ............. E04C 2/428 |
| GB | 714331 A | * | 8/1954 | ............. E04C 2/428 |
| GB | 1412453 A | * | 11/1975 | ............. E04C 2/428 |
| GB | 1418741 A | * | 12/1975 | ............. E04C 2/428 |
| GB | 1473479 A | * | 5/1977 | ............. E04C 2/428 |
| WO | WO-8605228 A1 | * | 9/1986 | ............. E04C 2/428 |
| WO | WO-9605024 A1 | * | 2/1996 | ............. E04C 2/428 |

* cited by examiner

SECURITY FOR GRATE COVERING UNDERGROUND AIR VENTS

CROSS REFERENCE TO RELATED APPLICATION

This application claims the priority benefit of U.S. Provisional Application No. 62/414,114 filed Oct. 28, 2016, the disclosures of which are incorporated herein by reference.

STATEMENT REGARDING FEDERALLY SPONSORED RESEARCH AND DEVELOPMENT

Not applicable

BACKGROUND OF THE DISCLOSURE

Technical Field

This invention relates to apparatus and methods of securing a grating over a ventilation shaft to an underground ventilation duct fluidly communicating through the ventilation shaft to an atmospheric opening of the shaft.

Background Art

Ventilation ducts connect underground chambers or tunnels such as subway tunnels to surface air via a ventilation shaft open at top to the atmosphere, in the instance of subways, usually located at a pedestrian sidewalk. Grating provides a surface over the ventilation shaft for pedestrian travel while allowing airflow through the shaft. The grating is an assembled grid of parallel load bearing bars with intersecting cross bars that space and hold the bearing bars erect. An intersection is where bearing bars and cross bars cross. The length of a grating is the dimension of a grating panel measured parallel to the bearing bars. The ends of the bearing bars may be free or banded by a flat band welded to the bearing bar ends. An opening or "cell" through which air passes is between adjacent bearing bars intersected by adjacent cross bars.

Ventilation grating is typically supported by a right angle flange embedded in concrete at the perimeter of the ventilation shaft and forming a top of the shaft. The embedded right angle flange provides an outwardly extending horizontal ledge rimming the shaft and a vertical wall extending to surface grade. The vertical wall has a height which accepts the grating so the grating does not project above surface grade. The vertical wall typically has legs projecting from the outer side of the vertical wall. The legs are embedded in concrete surrounding the ventilation shaft The bearing bars are fastened to the embedded support ledge of the shaft to hold the grating in place. The most rigid and permanent method of fastening the grating in place is welding the bearing bars to the embedded ledge. However, the grating may need to be removed, for example, to remove debris from the ventilation shaft under the grating. Various hold-down means are employed to removably fasten the grating to the embedded support ledge. One solution is blocks that are shop welded between bearing bars by the grating manufacturer and fastened to the ledge with studs or bolts. Another solution is placing various kinds of clips onto the top surface of the ends of bearing bars and fastening the clips to the embedded ledge, often by self tapping screws or other screw fasteners. Among such clip types are saddle clips (also called "M" clips) and Hilti disks, all of which are well known in the grating industry.

The size of a grating affects its removability. Taking a relatively small size ventilation shaft having a 4 feet by 4 feet opening as an example, a typical one-piece steel grating panel having a length of 4 feet and width of 4 feet may be formed of bearing bars 4 inches deep spaced on centers 1⅜ inches apart. Such a panel would weigh about 600 pounds, much too heavy for a small crew of workers to manually lift and remove after unfastening hold-downs. As a result, gratings meant to be removable are typically formed in smaller panel sizes (in this description, such panels are termed "sections") arranged side by side to cover a ventilation shaft opening. A grating section about 12 inches wide by about 4 feet long weighs about 150 pounds, making it relatively easily removable by a crew of 2 men using lifting hooks. Four such sections would cover a 4 feet by 4 feet opening. A problem with removable sections is putting them back. When putatively like sized removed sections are placed back over a shaft opening, they aren't always placed in the same location where they were when they were removed. In addition, sections of like size typically have some manufacturing variability of cell dimensions and locations. This means that the cell inserted hold-downs for the removed sections don't always line up with drill holes or studs in the embedded support ledge. This may result in a trial and error shuffling and reshuffling of sections to find a cell alignment for each section, or it may result in simply drilling another screw hole in the embedded ledge so that a cell where the hold-down is to be placed can align with the new hole. The problem with drilling another hole in embedded ledge is that redrilling can weaken the cement embedding of the right angle flange, leading to still more problems.

Another problem with gratings is that sidewalks have slopes that vary transversely and longitudinally. Installers employ shim plates placed on top of the embedded ledge to be under the grating to match the slope of the sidewalk and as needed to bring the grating up to sidewalk grade. Typically aluminum shim plates are placed under steel grating bars and over iron or steel embedded ledges. Because aluminum shim plates are a dissimilar metal to the grating metal and to the embedded ledge metal, electrolysis can occur between the metals when the metals get wet, causing galvanic corrosion. To prevent this corrosion, knowledgeable installers insert a galvanic isolator material between the shim and the grating section and between the shim and the embedded ledge. Use of shim plates and galvanic insulator materials adds to the complexity of fastening removable grating sections to the embedded ledge around the ventilation shaft. The shims interfere with directly attaching anchors or clips to the embedded ledge. If the shims are not attached to the embedded ledge, attaching the grating to the shims does not secure the grates to the embedded ledge. With the current means of attaching removable grating sections to an embedded ledge, the shims have to be attached to the embedded ledge and some means of attaching the grating to or through the shims has to be devised.

It would be desirable to have a removable grating mechanism that does not require securing the grating removably to an embedded ledge of a ventilation shaft, thus preserving the ability of installers to use shims to match the slope of the sidewalk or to bring the grating up to sidewalk grade without having to attach the shims to the embedded ledge in order to secure the grating to the ledge.

It is further desirable to have a mechanism for removably installing a grating or grating sections in a ventilation shaft that accommodates variability of cell dimensions and cell locations in gratings.

U.S. Pat. No. 9,752,342 issued Sep. 5, 2107 describes embodiments of apparatus that allows ventilation as usual for underground subway tunnels or other underground facilities through a ventilation shaft covered by gratings opening to atmosphere, yet on threat of surface flooding are manually operable to prevent flooding underground from surface waters pouring through the grating. The grating or grating sections covering such flood guarding apparatus needs to be removable to either service such flood guarding apparatus in place or to lift the apparatus as a unit for service out of the ventilation shaft; also to remove debris from the shaft. As with gratings covering ventilation shafts that aren't protected by flood guarding apparatus, it is desirable to secure removable grating or grating sections in the flood guarded ventilation shaft in a manner that overcomes variability of cell dimensions and locations and provides grating installers use of shims to match the slope of the sidewalk or to bring the grating up to sidewalk grade without having to attach the shims to an embedded ledge.

DETAILED DESCRIPTION OF EMBODIMENTS

Figure 1:
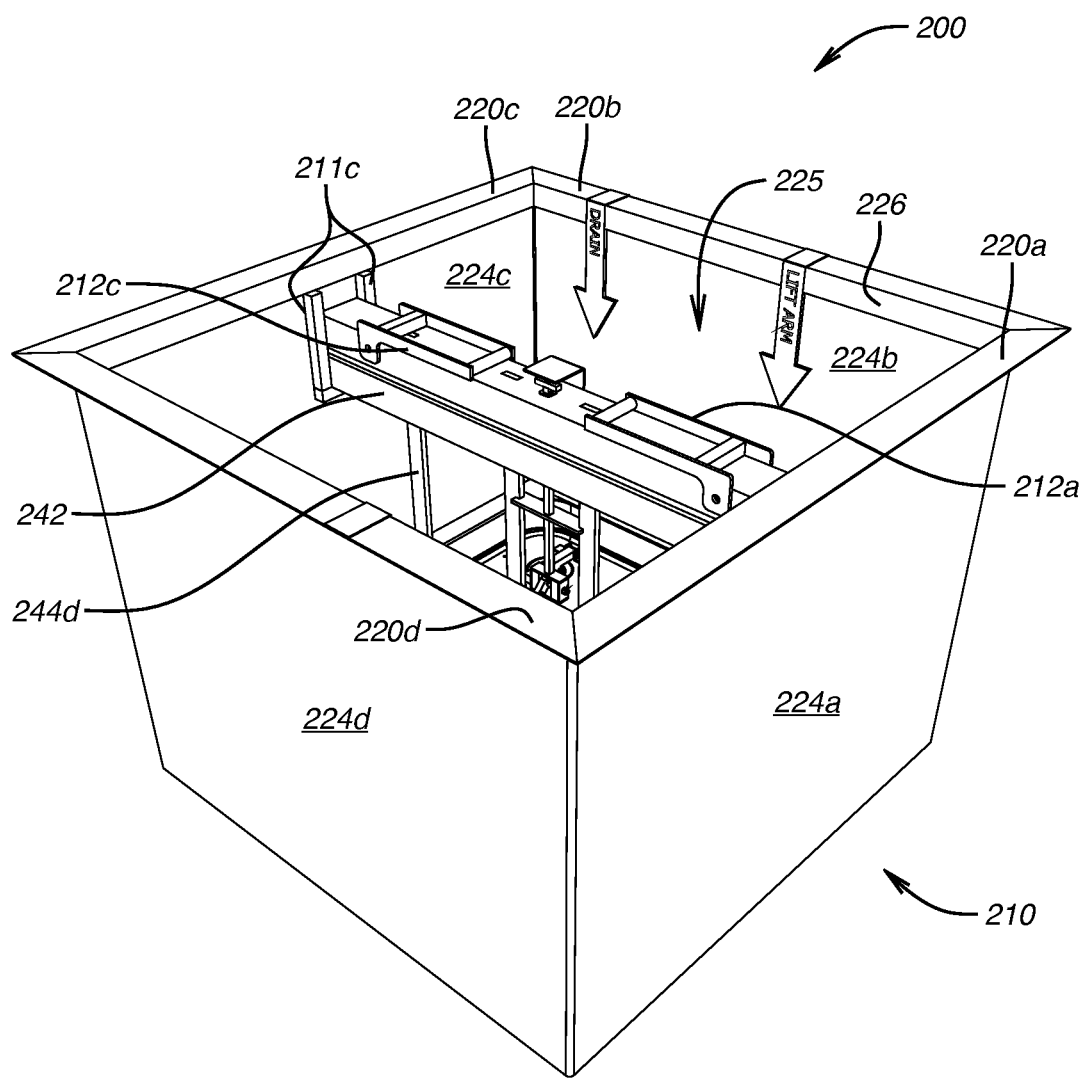
FIG. 1 is an isometric view of an example of a flood guard with a pair of flood guard panels in a lowered guarding position and atop which one or more grating sections may be secured by exemplary embodiments of the apparatus and process of this invention.

In the descriptions of exemplary embodiments, reference is made to the accompanying drawings, which form a part hereof and in which are shown, by way of illustration, specific embodiments in which the invention may be practiced. The drawings are representational, depicting possible arrangements of elements of the exemplary embodiments and are not necessarily to scale. Specific details disclosed herein are in every case a non-limiting embodiment representing concrete ways in which the concepts of the invention may be practiced. This serves to teach one skilled in the art to employ the present invention in virtually any appropriately detailed system, structure or manner consistent with those concepts. It will be seen that various changes and alternatives to the specific described embodiments and the details of those embodiments may be made within the scope of the invention. Because many varying and different embodiments may be made within the scope of the inventive concepts herein described and in the specific embodiments herein detailed, it is to be understood that the details herein are to be interpreted as illustrative and not as limiting.

For illustrative purposes of an application of the concepts herein disclosed, the embodied concepts are described in reference to a specific ventilation environment of a subway system. In the specific embodiments described herein as examples, it is assumed that the atmospheric opening for air passage has a rectilinear shape, as for grated grade level sidewalk openings for subway ventilation systems. However, the elements of the embodiments for securing a grating over a ventilation shaft may be configured to fit within downwardly vertically projected dimensions of any ventilation shaft surface opening serving any underground tunnel, chamber, room or other underground structure, whether rectilinear, circular or oval or some other shape.

As used in describing embodiments and in the claims, unless the term "grating section" is specifically used, the term "grating" is employed to include both the singular and the plural, so "grating" may mean a single grating panel or a plurality of grating sections that together provide a total grating overlay of a ventilation shaft.

In an embodiment, apparatus is described for securing a grating (meaning a single grating or a plurality of grating sections) over a ventilation shaft from an underground ventilation duct fluidly communicating through the ventilation shaft to an atmospheric opening of the shaft. The grating conventionally comprises parallel horizontal load bearing bars and cross bars between and transverse to the load bearing bars that connect the load bearing bars. The bars have a top surface and define an open cell between adjacent bearing and cross bars.

The apparatus comprises a vertically extending support body having horizontal outwardly extending flanges for projecting across a top of at least two opposing sides of the shaft, such as a shaft top conventionally provided by an embedded ledge. The flanges hang the support in the shaft for over topping by the grating.

The apparatus further comprises at least one anchoring member supported in the support at a level below the flanges and proximate the atmospheric opening, and at least one hold-down that can be connected to the anchoring member through the grating to secure the hold-down and the grating to the anchoring member. The term "connected to" or "connecting to" or "connected" to or "connectable" means joined to or placed into communication with, either directly or through intermediate components.

In an embodiment, the hold-down is a clip comprising at least one outwardly extending wing for engaging the top surface of adjacent bearing bars or adjacent cross bars of the grating, a vertical aperture adjacent the one or more wings, and a fastener insertable into or captive within the aperture of the clip to be connected to the anchoring member to secure the clip and the grating to the anchoring member.

In an embodiment, the fastener insertable into or captive within the aperture of the clip to be connected to the anchoring member may be a self-drilling screw, commonly called a TEK screw, sometimes a self-tapping screw or a bit tip screw.

In an alternative embodiment the anchoring member includes a threaded vertical aperture for location under the clip aperture and the fastener is threadably receivable in the vertical aperture.

In another embodiment, the anchoring member has a first side and a second side, and the apparatus further comprises a clamp having a moving member securely moveable to press fixedly against the first side of the anchoring member effective to hold the clamp to the anchoring member.

The clamp may take the form of several embodiments. In one clamp embodiment, the clamp comprises a cam and the moveable member is a locking block moveable against the anchoring member by rotation of the cam against the block. The cam may be circular member in which the center of rotation or fulcrum is offset from the center of the circle and may have a lever for effecting rotation of the cam about the center of rotation. In another clamp embodiment, the clamp comprises an elliptical counterbore vertical aperture in the base and a fastener having a convex head narrowing down to a fastener shaft receivable in the elliptical counterbore vertical aperture, and the moveable member is a washer with a concave central aperture receiving the fastener head and horizontally movable against the anchoring member on tightening the fastener in the elliptical counterbore vertical aperture.

The first two of these clamp embodiments are well known in the clamping arts and need no further description for a person of ordinary skill to make use of them in the ventilation shaft environment hereinafter described in more detail as a specific illustration of how a grating may be securely held down on a ventilation shaft without fasteners deployed onto the embedded ledge forming the top of the ventilation shaft.

A clamp embodiment first detailed hereinafter is one in which the clamp includes a base, a first arm extending from the base for placement against the second side of the anchoring member, and a moving member securely moveable to press fixedly against the first side of the anchoring member effective to hold the clamp to the anchoring member.

In an embodiment, the clamp comprises a base, suitably horizontal, having a first arm extending from the base, suitably vertically downwardly, for placement against the second side of the anchoring member and a second arm extending, suitably vertically downwardly, from the base and having a threaded aperture therein, suitably a horizontal aperture. The moveable member is a threaded fastener having a tip tightenable in the threaded aperture of the second arm, to press the tip fixedly against the first side of the anchoring member effective to hold the clamp to the anchoring member.

In an embodiment, the base of the clamp includes a threaded upper aperture in an upper side of the clamp and the fastener insertable into or captive within the aperture of the clip is threadingly receivable in the upper aperture of the base.

In another embodiment, the fastener insertable into or captive within the aperture of the clip is a self drilling screw fastenable in the base of the clamp.

In a particular, the anchoring member may comprise a vertical rail, and in such embodiment the base of the clamp is horizontal, and the moveable member of the clamp is horizontally moveable to press fixedly against the rail front side. In such an embodiment, the clamp suitably comprises a threaded horizontal aperture in a front side arm extending from the base and the moveable member is a threaded fastener having a tip tightenable in the threaded horizontal aperture to press the tip fixedly against the front side of the rail effective to hold the clamp to the rail. More particularly, the anchoring member may comprise (i) a vertical longitudinal rail having a top side, a front side and a backside supported inside the support; (ii) an inverted U-clamp having a unitary base and pair of spaced arms vertical to the base, a first arm for arrangement outside the front side of the rail and a second arm for arrangement outside the backside of the rail with the base straddling over the rail, the base including a threaded vertical aperture and the first arm including a threaded horizontal aperture and (iii) a threaded fastener for the threaded horizontal aperture of the clamp for insertion and screwing into the threaded horizontal aperture of the first arm to apply tip pressure against the front side of the rail to fix the clamp to the rail.

In an embodiment, the rail includes a terminal vertical plate transverse to the rail and adjacent the threaded horizontal aperture of the clamp to restrain the threaded fastener for the threaded horizontal aperture from escaping the threaded horizontal aperture when inserting or removing the fastener into or from the threaded horizontal aperture.

In an embodiment in which the base of the clamp includes a threaded vertical aperture in the upper side of the clamp and the fastener insertable into or captive within the aperture of the clip is threadingly receivable in the vertical aperture of the base, the fastener has a head and a threaded shank, the head being of larger diameter than the vertical aperture of the clip, the insertable fastener being receivable in the vertical aperture of the clamp and tightenable to attach the clip to the clamp effective to secure the grating to the rail.

In an alternative embodiment, the vertical aperture in an upper side of the clip may be a cam lock receiver and the fastener insertable into the vertical aperture of the clip may be a cam lock fastener. The fastener may be a quarter turn J-lock fastener.

The apparatus herein illustratively particularly described for securing grating over a ventilation shaft opening to atmosphere is deployed in a flood guard that allows ventilation as usual for underground tunnels through the ventilation shaft, yet when there is advance warning of a serious storm event such as an offshore hurricane or tropical storm predicted to make landfall as was the notorious 2013 super storm Sandy (a "threat of flooding"), the grating covered flood guard is manually operable by active human intervention to prevent underground flooding from surface waters pouring through the grating. The flood guard fits within the ventilation shaft and includes the mentioned support body supported by an embedded flange surrounding the shaft, the one or more anchoring members and the one or more hold-downs connectable to the anchoring members to secure the grating to the anchoring member.

The various directions such as "upper," "lower," "bottom," "top," "transverse", "perpendicular", "vertical", "horizontal," and so forth used in the detailed description of embodiments are made only with respect to easier explanation in conjunction with the drawings. The components may be oriented differently while performing the same function and accomplishing the same result as the embodiments herein detailed embody the concepts of the invention, and such terminologies are not to be understood as limiting the concepts which the embodiments exemplify.

The term "perpendicular" means substantially at a right angle to a reference to a degree that if not absolutely a right angle will not materially adversely affect the arrangement and function of the element described as perpendicular. The terms "vertical" or "vertically" include but are not limited to literal vertical and generally mean oriented up and down with respect to the earth's horizon to a degree that if not absolutely vertical will not materially adversely affect the function of the element described as vertical. Similarly, the terms "horizontal" or "horizontally" include but are not limited to literal horizontal and generally mean not out of level with respect to the earth's horizon to a degree that will materially adversely affect the function of the element described as horizontal.

As used herein, the use of the word "a" or "an" when used in conjunction with the term "comprise", "comprises" or "comprising" (or the synonymous "has", "have" or "having" or "include", "includes" or "including") in the claims and/or the specification may mean "one," but it is also consistent with meaning "one or more," "at least one," and "one or more than one."

Figure 2:
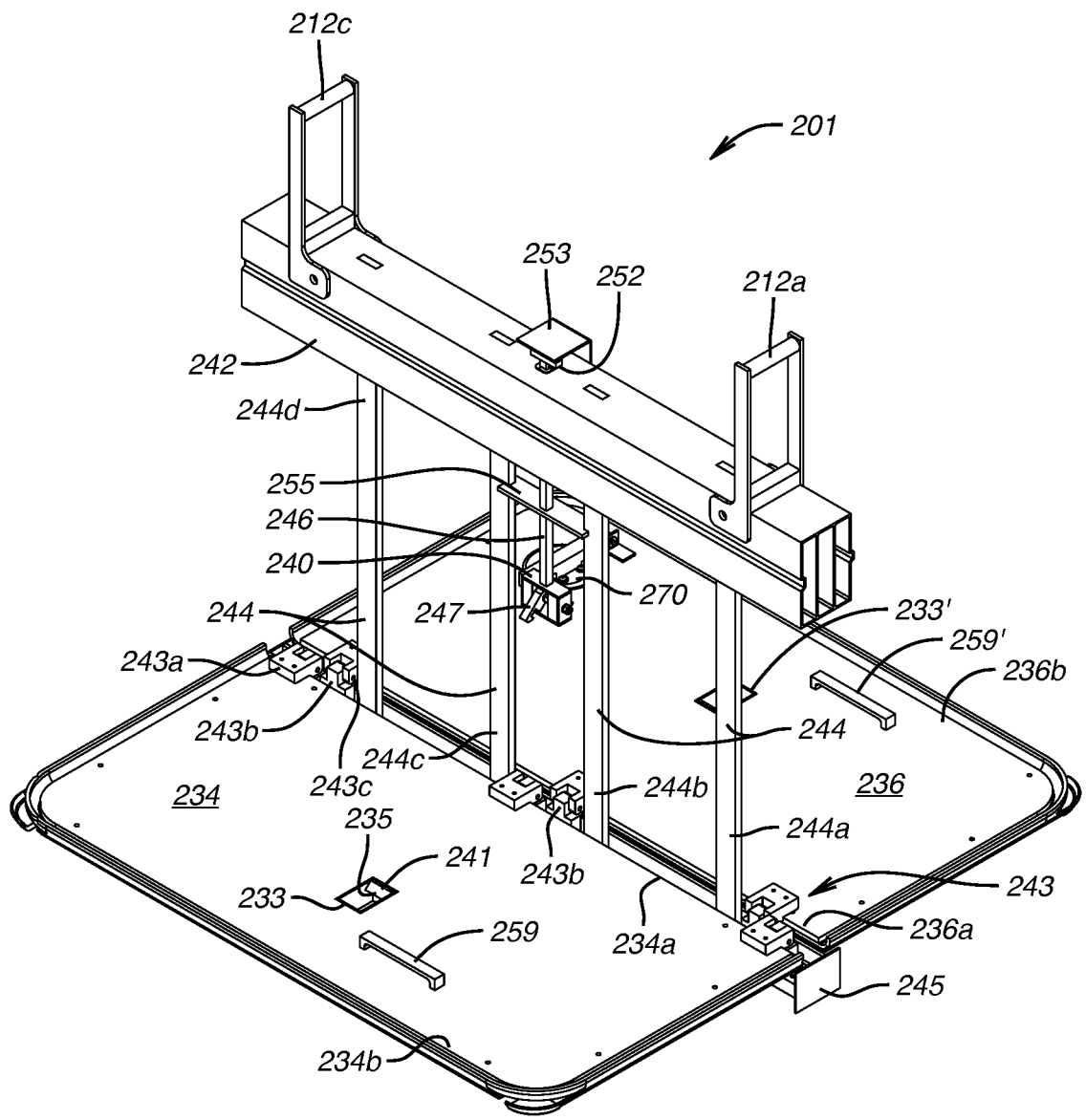
FIG. 2 is an isometric view of a removable flood guard unit shown installed in FIG. 1 with a pair of flood guard panels disposed in a lowered guarding position.
Figure 3:
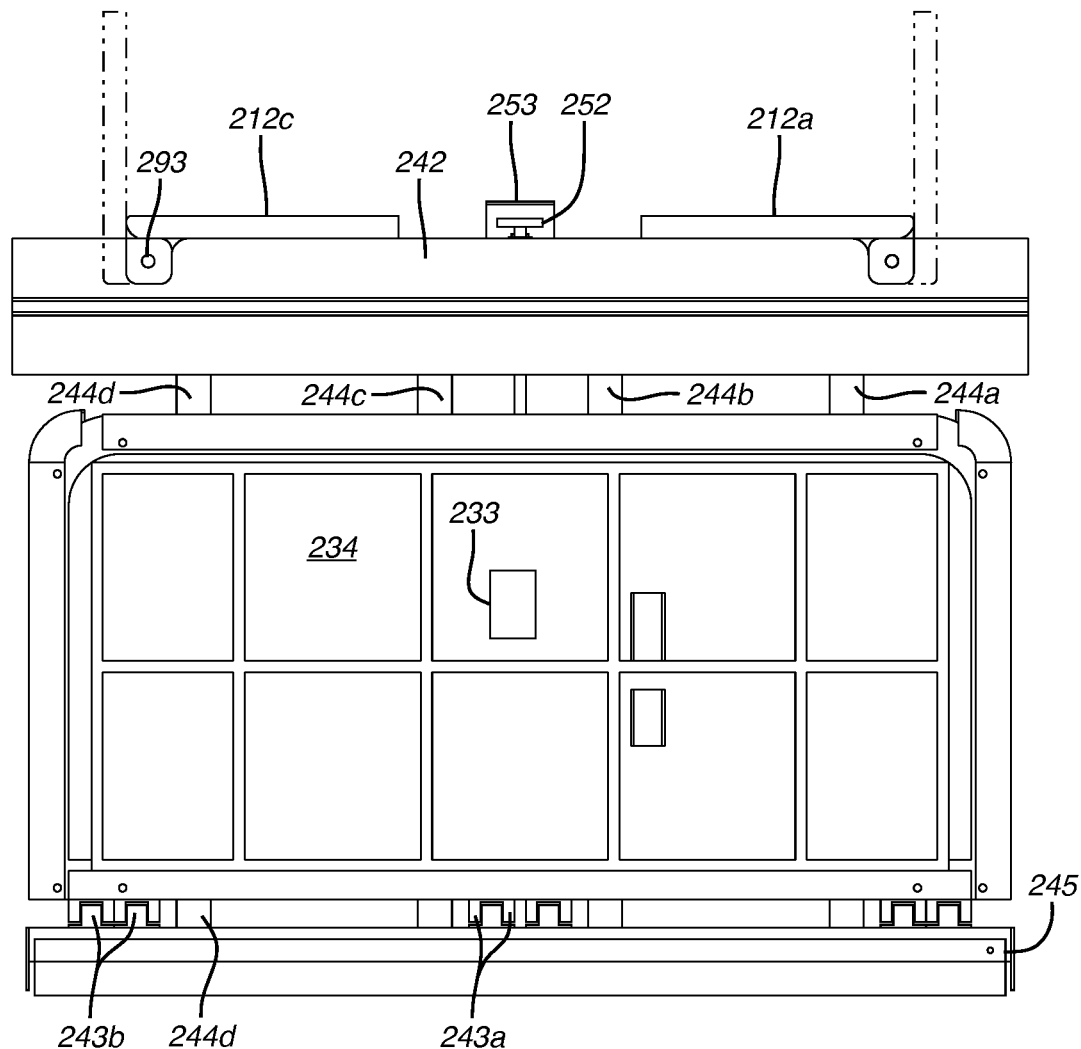
FIG. 3 is an elevational side view of the removable flood guard unit of FIG. 2 with a pair of flood guarding panels in a raised home position.

An exemplary embodiment of apparatus for securing grating over a flood guard for preventing downward flow of surface water into an underground ventilation duct fluidly communicating through a ventilation shaft to a rectilinear atmospheric opening of the shaft is described after first setting an environment in which such apparatus may be employed. Referring first to FIGS. 1-3, a flood guard 200 over which the grating may be secured comprises a support body embodied in a quadrilateral (four-sided) box 210 inclusive of sidewalls 224 (224a, 224b, 224c, 224d) having at the upper extent of the sidewalls flanges 220 (220a, 220b, 220c, 220d) transverse to the sidewalls 224 for extension over a top of walls of a ventilation shaft for suspension of box 210 vertically in the shaft to define a passage 225 between top opening 226 and bottom opening (not shown) of box 210 for fluid communication of a ventilation duct up through box 210 to an atmospheric opening a top opening 226. The flood guard shown is suitable as a drop in solution to sealing vent passages from storm waters by lowering it into a ventilation shaft to rest on walls of the shaft.

A beam 242 comprising extruded tubing unobstructively horizontally spans across passage 225 and connects to opposed sidewalls 224a, 224c of box 210 proximate top opening 226. Beam 242 is lodged in U-shaped brackets 211a, 211c, conveniently lowered into brackets 211a, 211c by operators holding beam foldable handles 212a, 212c. Beam 242 and straps 244 described below comprise a support member for equipment described below. Beam 242 and its strap attached equipment can be lowered into place as a complete unit 201 after box 210 is installed in ventilation shaft resting on flanges 220. Unit 201 can be removed from box 210 for servicing by lifting beam 242 from brackets 211a, 211c by means of handles 212a, 212c.

Referring to FIGS. 2 and 3, a hinge mounting member 245 unobstructively horizontally spans across passage 225 suspended from beam 242 by a plurality of straps 244a, 244b, 244c, 244d. Lodged in U-channels 211a and 211c, beam 242 and hinge mounting member 245 spanning between sidewalls 224a, 224c are centered in passage 225 of box 210 with beam 242 directly over hinge mounting member 245. Hinge mounting member 245 mounts and supports a plurality of hinge members 243. Hinge members 243 each comprise a stationary member 243b, a movable member 243a and a hinge pin 243c that interconnects stationary member 243b and movable member 243a. Stationary member 243b connects to hinge mounting member 245.

A pair of opposing panels 234, 236 each having proximal and distal portions, respectively 234a, 234b and 236a, 236b, are connected at proximal portions 234a, 236a by moveable hinge members 243a to stationary hinge members 243b and thereby to hinge mounting member 245 suspended via straps 244a-244d to beam 242. The connection of moveable hinge members 243a to the proximal portions 234a, 236a of panels 234, 236 on hinge pins 243c forms respective pivot axes of panels 234, 236 for vertical rotation of panels 234, 236. Panels 234, 236 rotate in directions opposite each other from or to an upright home position under beam 242. Rotation of the panels upwardly (one clockwise, the other counterclockwise) to a home position tucked under beam 242 is effected manually. Each panel 234, 236 has a handle 259, 259' on its top side remote from the pivot axes of pins 243c of the hinge members 243 to which the proximate ends 234a, 236a of the panels 234, 236 are connected. The handles are used to lift the panels manually. A hooking tool can be used by an operator and inserted through a secured grate over box 210 to grasp handle 259 or 259' to lift panel 234 or 236.

The home position of the panels tucked under beam 242 does not occlude passage 225. Rotation of the panels downwardly (one clockwise, the other counterclockwise) is solely by impetus of gravity on the weight of the panels when the panels are released from the home position, as further described below. Panels 234, 236 in gravitational rotation fall to a lower passage closing position where further rotation is prevented by stops not shown. Each panel has a profile that closes the passage when the panels gravitationally rotate to the passage closing position. FIGS. 1 and 2 show the panels in a horizontal passage closing position.

Panels 234, 236 each include a recess respectively 233, 233' opening in the panel top sides 238 intermediate the distal and proximate ends of the panels. A ramp 241, 241' originating at an entrance of the recess 233, 233' declines in a direction toward the distal end 234b 236b of the panels 234, 236 to terminate in a latch catch edge 235, 235'. Panels 234, 236 are held in home position 213 by a panel holder 240. Panel holder 240 is movably supported in box 210 by a grip rod 246 connected to panel holder 240. Rod 246 is mounted through beam 242 vertically slideably translatable through a brace 255 fastened between straps 244b, 244c and terminates above beam 242 at a T-handle grip 252 under a cover 253 sheltering T-handle grip 252 from pedestrian view through a grate covering box 210 to reduce if not avoid gratuitous tampering with the apparatus and unwanted deployment of the panels by mischief makers. Panel holder 240 includes moveable member 247 on a side facing panel 234 and a like movable member 249 (not viewable) on a side facing panel 236. It is the moveable member components 247, 249 of panel holder 240 that catch and hold panels 234, 236 in the upright home position 213. Rod 246 and grip 252 comprise a panel releaser. The T-handle configures grip 252 for convenient grasping, such as by a hook that can be vertically inserted through a small opening in a grate over box 210 to reach under cover 253 and hook grip 252 for lifting panel holder 240. Lifting rod 246 by grip 252 moves panel holder 240 upwardly to cause moveable members 247, 249 to release held panels 234, 236 and allow the panels to rotationally gravitationally fall under the impetus of their own weight from the upright home position 213 to the lower passage closing position 215.

Figure 5:
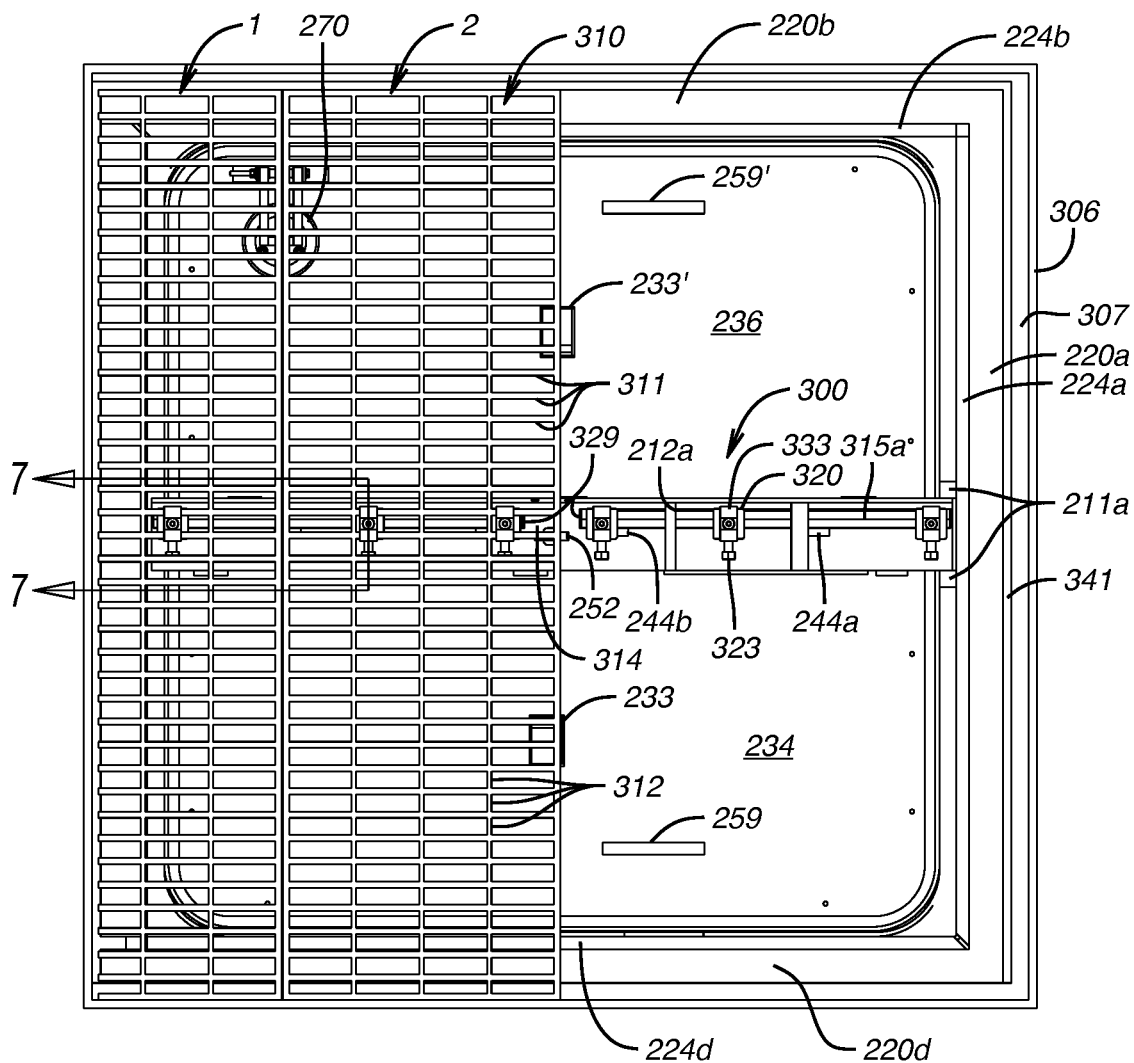
FIG. 5 is a top plan view of the embodiment of FIG. 4 showing grating sections secured to the flood guard embodiments of FIGS. 1-3 in a ventilation shaft with grating sections over the right half of flood guard unit removed to reveal embodiments used to secure the gratings.
Figure 8:
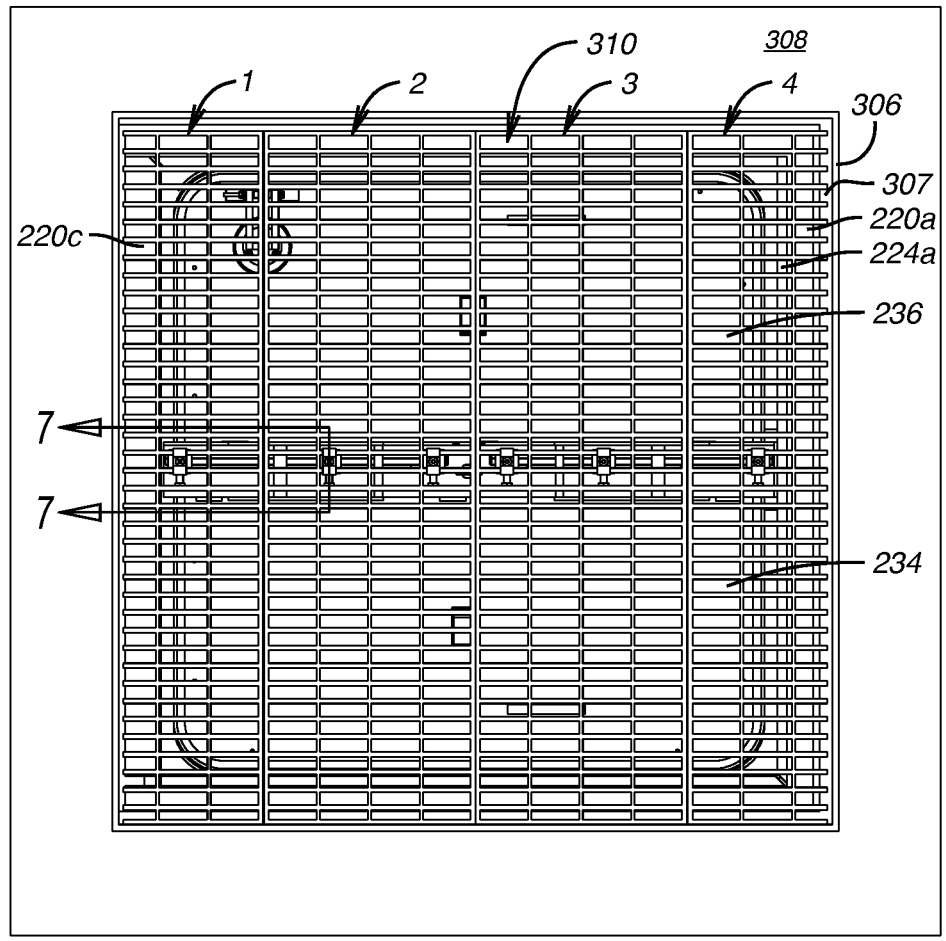
FIG. 8 is a top plan view the same as FIG. 5 of an embodiment showing a plurality of grating sections completely covering a ventilation shaft secured to the flood guard embodiments of FIGS. 1-3.

At least one of the panels, such as panel 236 as in the depicted embodiment in FIGS. 2, 5 and 8 may be fitted with a drain 270 intermediate the proximate and distal ends of the panel to allow the limited amount of water captured above the lowered panels to be drained into the shaft where the limited amount of capture water can be handled by ventilation system drains and pumps.

Figure 4:
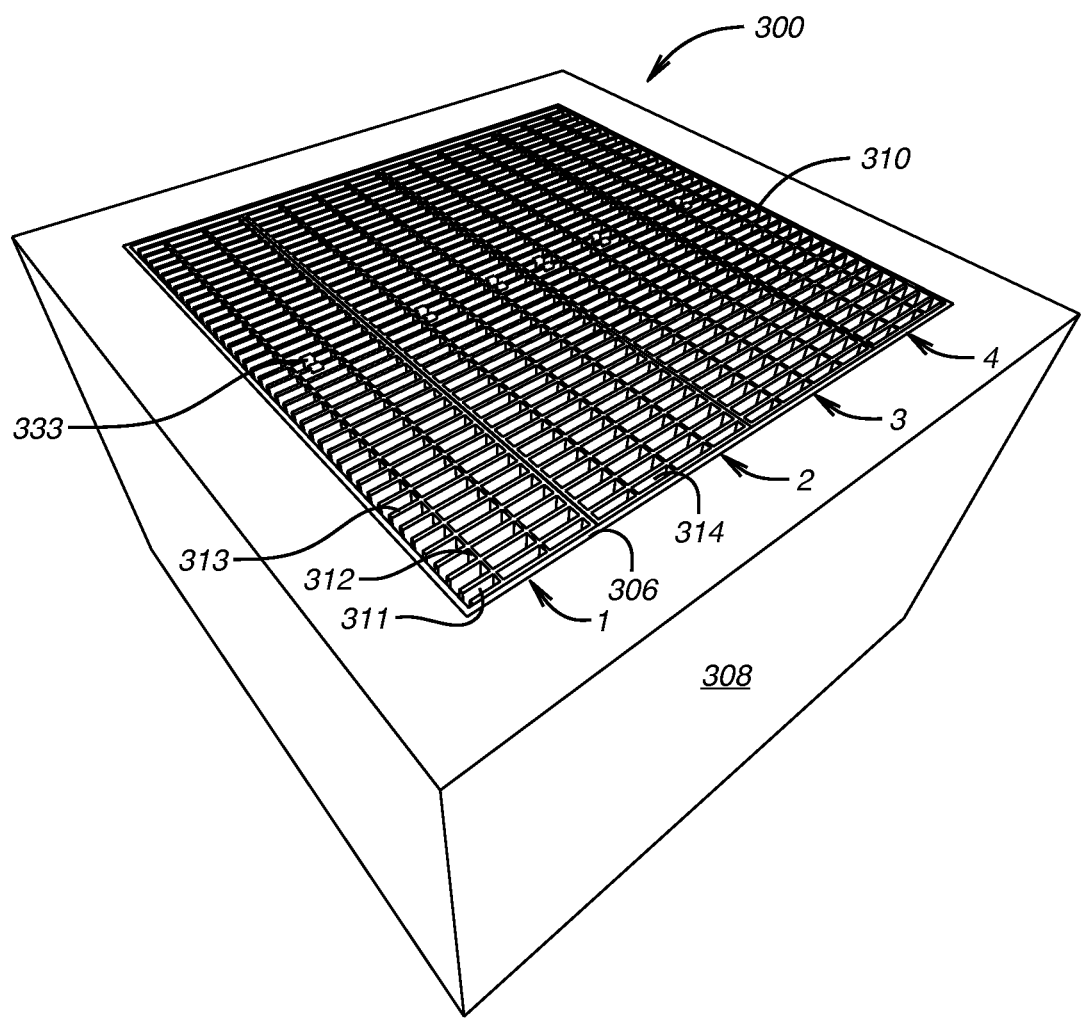
FIG. 4 is an isometric view showing a plurality of grating sections secured over the flood guard embodiments of FIGS. 1-3 in a ventilation shaft in which a right angle flange embedded in concrete provides a ledge on which the flood guard support body hangs.

Referring now to FIGS. 4, 5 and 8, in an exemplary embodiment apparatus 300 is depicted installed on a flood guard 200 and securing a grating 310 over a ventilation shaft to an underground ventilation duct fluidly communicating through the ventilation shaft to an atmospheric opening of the shaft. A right angle flange embedded in concrete at the perimeter of the ventilation shaft provides an outwardly extending horizontal ledge 307 rimming the shaft forming a top of the shaft and a vertical wall 306 extending to surface grade. Flood guard 200 is suspended in the ventilation shaft by flanges 220a-220d hanging on embedded ledge 307. As is typical for subway ventilation shaft gratings, each grating section comprises parallel load bearing bars 312 and parallel cross bars 311 that connect the load bearing bars 312. The bars 311, 312 have a top surface 313 and define an open cell 314 between adjacent load bearing and cross bars 311, 312. In the embodiments depicted in FIGS. 4, 5 and 8, the bearing bars 312 run north-to-south (top-to-bottom) as viewed, and the cross bars run west-to-east (left to right). Grating 310 in this exemplary embodiment comprises four grating sections numbered 1, 2, 3 and 4 in FIGS. 4 and 8. The two outer grating sections 1 and 4 have three north-to-south columns of bearing bars 312 and the two intermediate panels 2 and 3 have four north-to-south columns of bearing bars. Unlike the prior art described above in "Background Art," apparatus 300 removably secures grating sections 1, 2, 3 and 4 without the grating sections being fastened to embedded ledge 307.

Referring to FIGS. 5-8, apparatus 300 comprises at least one rail 315 having a vertical face 316 inside support 210. Vertical rail 315 has a top side 318, a bottom side 317, a front side which may be vertical face 316, and a backside 319. Bottom side 317 is connected to top side 217 of at least a portion of beam 242 parallel to beam 242. Apparatus 300 includes an inverted U-clamp 320 having a threaded horizontal aperture 321 and a threaded vertical aperture 322 and a threaded fastener 323 for threading into threaded horizontal aperture 321 of clamp 320 to apply tip pressure to the vertical face 316 of rail 315.

In an exemplary embodiment, clamp 320 comprises an inverted U-clamp comprising a unitary base 324 and first and second spaced arms, respectively 325, 326 vertical to base 324. Arms 325, 326 terminate in ends 327, 328 moveably supported on beam 242, first arm 325 for arrangement outside the front side 316 of rail 315 and second arm 326 for arrangement outside the backside 319 of rail 315 with base 324 straddling the top side 318 of rail 315. Base 324 includes the threaded vertical aperture 322 and first arm 325 includes the threaded horizontal aperture 321. In an exemplary embodiment, threaded fastener 323 is a set screw that screws into the threaded horizontal aperture 321 of first arm 325 to apply tip pressure against front side 316 of rail 315 to fix clamp 320 to rail 315. A set screw 323 suitably has a square head or hexagonal head that enables wrench tightening.

Apparatus 300 further includes a clip 330 comprising a recessed central area 331 with a centered vertical aperture 332 and outwardly extending wings 333 for insertion of recessed central area 331 into a selected cell 314 in grating 310 to engage top surface 313 of at least adjacent load bearing bars 311 of the selected cell 314 when grating 310 is positioned over horizontal flanges 220a-220d of support 210. Apparatus 300 further comprises a threaded fastener 334 for threaded vertical aperture 322 of clamp 320 for insertion into centered vertical aperture 332 of the clip and tightening into vertical aperture 322 of clamp 320 until clip 330 is secured to clamp 320 fixed to rail 315, thereby securing grating 310 to rail 315 in support body 210 in the ventilation shaft. Threaded fastener 334 for threaded vertical aperture 322 suitably is a socket or button head cap screw. A socket head cap screw can have a round cap with a hex head and can be tightened with a socket wrench drive.

Support 210, as explained above for a flood guard 200 for which apparatus 300 may be applied, includes means for releasing panels 234, 236 in the form of a panel holder 240 that is manually actuated by lifting T-handle grip 252, which in FIGS. 1-3 is sheltered under cover 253. In the embodiment shown in FIGS. 4-8, a plurality of rails 315 (315a and 315c in FIGS. 5, 6 and 8) are employed, horizontally spaced apart with T-handle grip 252 interposed between rails 315a, 315c. In a support body 210 that does not employ a panel release mechanism rising above beam 242, a single rail 315 may be used.

In an embodiment in which a plurality of rails 315 are employed, the rails 315 may include a terminal vertical flange 329 transverse to beam 242 (see FIGS. 4 and 5). Flange 329 provides a means to restrain the threaded fastener 323 for the threaded horizontal aperture 321 from escaping when inserting or removing the fastener into or from threaded horizontal aperture 321.

Figure 6:
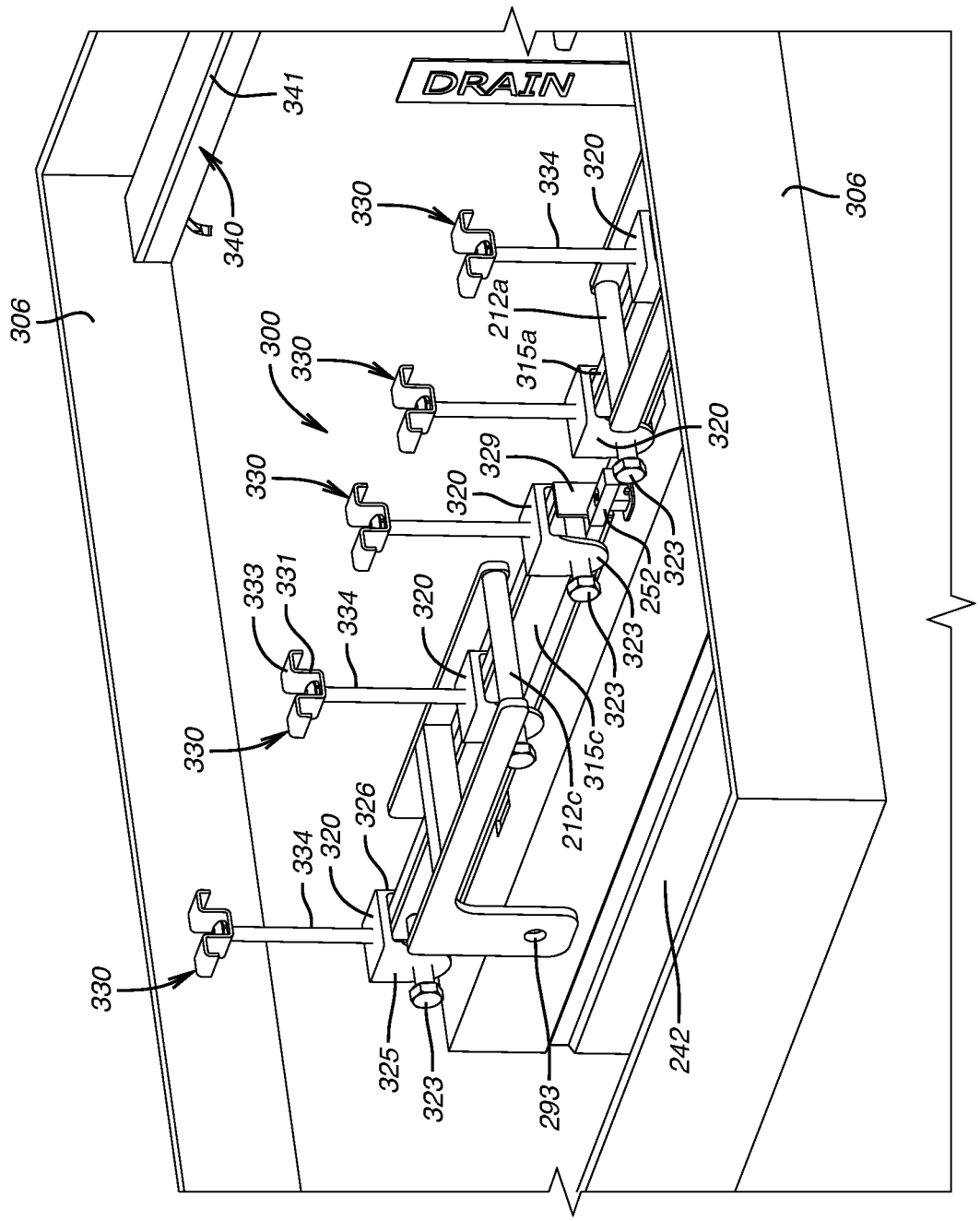
FIG. 6 is a schematic perspective of an embodiment for securing removable grating sections over a ventilation shaft in which a flood guard of FIGS. 1-3 is installed.
Figure 7:
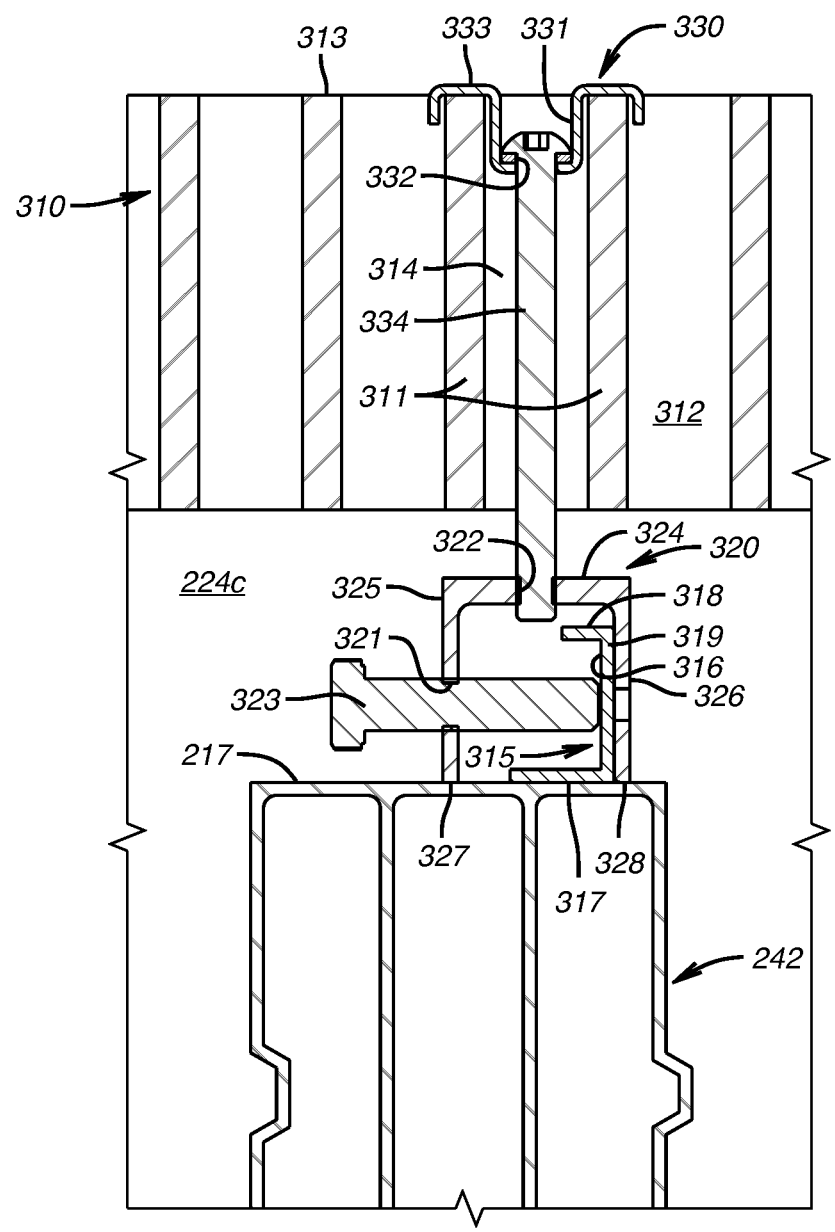
FIG. 7 is an schematic cross section view of the securing apparatus of FIGS. 4-6 taken along the lines 7-7 of FIGS. 5 and 8.

As explained above in respect to FIGS. 1-3, handles 212a, 212c pivotably connected to beam 242 are pivotally raiseable from a prone position to an upright position for lifting beam 242 from the support. Referring to FIG. 6, in an embodiment involving apparatus 300, a pivotation axis 293 of each of handles 212a, 212c is placed on beam 242 so that in the prone position of handles 212a, 212c the handles rest on the top of rail 315 spaced from clamp 320. In an embodiment, pivotation axis 293 is between a pair of U-clamps 320 (see FIGS. 5 and 6).

As mentioned above, installers may use shims such as aluminum bars placed on top of the embedded ledge to match the slope of a sidewalk or to bring the grating up to sidewalk grade. In FIG. 6, reference numeral 340 schematically indicates a shim that would lay on flange 220b of support 210. Reference numeral 341 indicates a rubber or other insulator strip laid on top of aluminum bar 340 to prevent galvanic corrosion between the dissimilar metal of the steel bars 311, 312 of grating 310 and aluminum bars 340 used for shims. Apparatus 300 secures grating sections 1, 2, 3 and 4 in a manner that allows shim bars to be placed on top of the embedded flange lip 307 to match the slope of a sidewalk or to bring the grating 310 to grade but without interfering with the manner of securing the grating sections to the grating sections support structure.

In use of apparatus 300 for securing grating 310 over a ventilation shaft to an underground ventilation duct fluidly communicating through the ventilation shaft to an atmospheric opening of the shaft, the grating comprising parallel load bearing bars 312 and cross bars 311 that connect the load bearing bars, the bars having a top surface 313 and bars 311 and 312 defining an open cell 314 between adjacent such bars 311 and 312, a procedure that may be used comprises (a) providing (1) a support 210 supported by a flange surrounding the shaft and comprising opposed lateral sidewalls 224 arranged in the shaft defining a passage 225 between top opening 226 and a bottom opening (not viewable) of support 210 for fluid communication of the ventilation duct up through support 210 to the atmosphere at top opening 226, support 210 being configured to support at least one grating 310 over top opening, (2) a beam 242 having ends 216 and a top side 217 unobstructively horizontally spanning across the passage and supported at ends 216 on opposed sides of support 210 under and proximate top opening 226, (3) at least one vertical rail 315 having a top side 318 and bottom side 317 and a front side and a backside, respectively 316, 319 connected at the bottom side 317 to the top side 217 of at least a portion of beam 242 and that runs horizontally parallel to beam 242, (4) a clamp 320 having a threaded horizontal aperture 321 and a threaded vertical aperture 322, (5) a threaded fastener 323 for the threaded horizontal aperture 322 of clamp 320, (6) a clip 330 comprising a recessed central area 331 with a centered vertical aperture 332 and outwardly extending wings 333, (7) a threaded fastener 334 for the threaded vertical aperture 322 of clamp 320, and (b) identifying at least one cell 314 in grating 310 that would be vertically above rail 315 when grating 310 is placed onto support 210, (c) positioning clamp 320 across the rail 315 so the threaded horizontal aperture 321 is perpendicular to rail 315 and the vertical threaded aperture 322 is vertically over rail 315, (d) inserting the threaded fastener 323 in the threaded horizontal aperture 321 and tightening it to affix clamp 320 to rail 315, (e) placing grating 310 onto support 210 such that the identified cell 314 of grating 310 is vertically directly over vertical aperture 322 of clamp 315, (f) placing the recessed central area 331 of clip 330 in identified cell 314 of grating 310 to engage the outwardly extending wings 333 with the top surface 313 of at least the adjacent cross bars 311, (g) determining whether the vertical aperture 332 in the recessed central area 331 of clip 330 is directly aligned with the vertical aperture 322 of clamp 320, and if so, proceeding to step (i), but if not, (h) loosening threaded fastener 323 in threaded horizontal aperture 321 to loosen clamp 320 and moving clamp 320 (x) linearly along rail 315 or (y) transversely to rail 315, or both (x) and (y) to align the vertical aperture 332 directly with the vertical aperture 322 of clamp 320 and retightening threaded fastener 323 to refasten clamp 320 to rail 315, and (i) inserting threaded fastener 334 for the threaded vertical aperture 322 of clamp 320 into the vertical aperture 332 of clip 330 and screwing threaded fastener 334 into the directly aligned vertical aperture 332 of clamp 330 until clip 330 secures grating 310 to clamp 320.

The step (b) of identifying may be accomplished by locating the cross bar 311 that would be to the side of rail 315 when grating 310 is placed onto support 210 in step (e) and then measuring the distance from an end of a located cross bar to the mid-point of that cross bar that would be adjacent a cell 314 in which a clip 330 would be placed in step (f).

The step (c) of positioning clamp 320 may be performed by locating a place along rail 315 corresponding to the place where the mid-point of the measured cross bar would be and positioning clamp 320 there.

Conversely a place along rail 315 may be picked for location of clamp 320 and the cross bar 311 that would be to the side of rail 315 when grating 310 is placed onto support 210 would be located the distance measured from the end of a located cross bar to the mid-point of that cross bar to identify a cell 314 in which a clip 330 would be placed in step (f). Thus steps (b) and (c) may be conducted either step (b) before step (c) or step (c) before step (b).

Step (g) may be accomplished by use of a laser beam of a laser pointer shown though vertical aperture 332 to see if aperture 332 is directly aligned with the vertical aperture 322 of clamp 320.

Step (h) for loosening threaded fastener 323 may be accomplished by inserting a tool such as a right angled socket drive though a cell close to cell 314, and a pusher bar may be inserted through a cell close to cell 314 to move clamp 330 linearly along rail 315. A shim may be inserted by a jawed tool through a cell close to cell 314 and placed between the backside 319 of rail 315 and the second arm 328 of claim 320 to move clamp 320 transversely to rail 315.

Alternatively, the process for securing a grating 310 over a ventilation shaft to an underground ventilation duct fluidly communicating through the ventilation shaft to an atmospheric opening of the shaft may more laboriously comprise, after step (a) above, said clamp 320 of step (a) comprising a U-clamp 320 including a unitary base 324 and a pair of spaced first and second arms 325, 326 vertical to base 324 and terminating in ends 327, 328, first arm 325 including threaded horizontal aperture 321 between base 324 and end 327 of first arm 325 and base 324 including a threaded vertical aperture 322 between arms 325, 326, (b) identifying a cell 314 in the grating 310 that would be vertically above the rail 315 when grating 310 is placed onto support 210, (c) determining a location along a length of rail 315 that would be vertically directly under identified cell 314 of grating 310 when grating 310 is placed onto support 210, (d) positioning U-clamp 320 at the determined place along the length of rail 315 with first arm 325 of U-clamp 320 outside the front side 316 of rail 315, with second arm 326 of U-clamp 320 outside the backside 319 of rail 315, with the base 324 of U-clamp 320 straddling the top side 318 of rail 315, the ends 327, 328 of the arms moveably supported on beam 242, (e) screwing a threaded set screw 323 into the threaded horizontal aperture 321 of first arm 325 to apply set screw tip pressure against the front side 316 of rail 315 effective to fix clamp 320 to rail 315, (f) placing grating 310 onto support 210 such that identified cell 314 of grating 310 is vertically directly over the vertical aperture 322 of U-clamp 320, (g) placing the recessed central area 331 of clip 330 in identified cell 314 of grating 310 to engage the outwardly extending wings 333 with the top surface 313 of at least the adjacent cross bars 311, (h) determining whether the vertical aperture 332 in the recessed central area 331 of clip 330 is directly aligned with the vertical aperture 322 of base 324 of U-clamp 320, and if so, proceeding to step (i), but if not, (1) removing grating 310, (2) unscrewing set screw 323 a few turns to release the tip pressure on the front side 316 of rail 315, and (3) either, (A) (x) before or after such step (2) selecting a shim of thickness effective to move the vertical aperture 322 of base 324 of U-clamp 320 away from the front side 316 of rail 315 enough to align such vertical aperture 322 directly under the vertical aperture 332 of clip 330, (y) after such step (2) and step (x) placing the shim between the backside of the rail and the second arm of the U claim, and (z) rescrewing the set screw in the threaded horizontal aperture of the first arm to reapply set screw tip pressure against the front side of the rail effective to fix the shimmed clamp to the rail, or (B) (xx) moving the clamp linearly along the rail enough to linearly align such vertical aperture directly under the vertical aperture of the base of the clip, and (yy) rescrewing the set screw in the threaded horizontal aperture of the first arm to reapply set screw tip pressure against the front side of the rail effective to fix the linearly aligned clamp to the rail, or (C) performing a combination of steps (h)(2)(A)(x) and (y) and (h)(2)(B)(xx), and then rescrewing the set screw in the threaded horizontal aperture of the first arm to reapply set screw tip pressure against the front side of the rail effective to fix the shimmed and linearly aligned clamp to the rail, (i) replacing the grating onto the support such that the identified cell of the grating is vertically directly over the vertical aperture of the clamp, (j) providing a fastening member having a head of larger diameter than the centered vertical aperture of the clip and a threaded shank insertable in the centered vertical aperture of the clip and receivable in the vertical aperture of the base of the clamp, and (k) inserting the fastening member into the vertical aperture of the clip and screwing the fastening member into the directly aligned vertical aperture of the base of the clamp until the clip secures the grating to the U clamp.

In most instances, a plurality of apparatus 300 is employed. A process for securing a grating 310 over a ventilation shaft to an underground ventilation duct fluidly communicating through the ventilation shaft to an atmospheric opening of the shaft may comprise, after step (a) above clamp 320 provided in step (a) comprising a U-clamp 320 including a unitary base 324 and a pair of spaced first and second arms 325, 326 vertical to base 324 and terminating in ends 327, 328, first arm 325 including threaded horizontal aperture 321 between base 324 and end 327 of first arm 325 and base 324 including a threaded vertical aperture 322 between arms 325, 326, (b) identifying a plurality of cells 314 in the grating that would be vertically above the rail 315 when the grating 310 is placed onto support 210, (c) determining a plurality of locations along a length of rail 315 that would be vertically directly under the identified cells 314 of grating 310 when grating 310 is placed onto support 210, (d) positioning each the U-clamps 320 at each the determined places along the length of the rail with the first arm 325 of U-clamp 320 outside the front side 316 of rail 315, with second arm 326 of U-clamp 320 outside the backside 319 of rail 315, with the base 324 of U-clamp 320 straddling the top side 318 of rail 315, the ends 327, 328 of respectively arms 325, 326 moveably supported on beam 242, (e) screwing a threaded set screw 323 into the threaded horizontal aperture 321 of the first arm 325 of each the U-clamps 320 to apply set screw tip pressure against the front side 316 of rail 315 effective to fix U-clamp 320 to rail 315 at each of the determined locations along the length of rail 315, (f) placing grating 310 onto support 210 such that the identified cells 314 of grating 310 are vertically directly over the vertical aperture 322 of each of the U-clamps 320, (g) placing the recessed central area 331 of clips 330 in the identified cells 314 of grating 310 to engage the outwardly extending wings 333 with the top surface 313 of at least the adjacent cross bars 311, (h) determining whether the vertical aperture 332 in each of the clip 330 is directly aligned with the vertical aperture 322 of each of the U-clamps 320, and if so, proceeding to step (i), but if not, as to any one or more unaligned U-clamps 320, (1) removing the grating, (2) unscrewing the set screw 323 of the one or more unaligned clamps 320 a few turns to release the tip pressure on the front side 316 of rail 315 at the one or more unaligned clamps 320, and (3) either (A) (x) before or after step (2) selecting a shim of thickness effective to move the vertical aperture 332 of the one or more unaligned U-clamps 320 away from the front side 316 of rail 315 enough to align such vertical aperture 322 directly under the vertical aperture 332 of the clips 330 over the unaligned one or more U-clamps 320, (y) placing the shim between the backside 319 of rail 315 and the second arm 326 of the one or more unaligned U-clamps 320, and (z) rescrewing set screw 323 in the threaded horizontal aperture 321 of the first arm 325 of the one or more shimmed U-clamps 320 to reapply set screw tip pressure against the front side 316 of rail 315 effective to fix the one or more shimmed U-clamps to rail 315, or (B) (xx) moving each unaligned clamp 320 linearly along rail 315 enough to linearly align such vertical aperture 322 thereof directly under the vertical aperture 332 of clips 330 in the cells 314, and (yy) rescrewing the set screws 323 in the threaded horizontal aperture 321 of the first arm 325 of each such linearly aligned clamp 320 to reapply set screw tip pressure against the front side 316 of the rail effective to fix the linearly aligned clamps 320 to rail 315, or (C) performing a combination of steps (h)(2)(A)(x) and (y) and (h)(2)(B)(xx), and then rescrewing the set screw 323 in the threaded horizontal aperture 321 of the first arm 325 of each such shimmed and linearly aligned clamps 320 to reapply set screw tip pressure against the front side 316 of rail 315 effective to fix each shimmed and linearly adjusted clamp 320 to rail 315, (i) replacing grating 310 onto support 210 such that the identified cells 314 of grating 310 are vertically directly over the vertical aperture 322 of each of the U-clamps 320, (j) providing a plurality of fastening members 334 each having a head of larger diameter than the centered vertical aperture 332 of the clips 330 and a threaded shank insertable in the centered vertical aperture 332 of clip 330 and receivable in the vertical aperture 322 of the base 324 of clamps 320, and (k) inserting the fastening members 334 into the centered vertical aperture 332 of each of the clips 330 and screwing the fastening members 334 into the directly aligned vertical apertures 322 of the base 324 of each of the U-clamps 320 until the clips 330 secure the grating 310 to the U-clamps 320.

An alternative to the rail and clamp based anchoring member embodiments described in connection with FIGS. 5-8 is at least one anchoring member also supported in support 210 at a level below flanges 220a, 220c proximate atmospheric opening 226 in the form of a bar plate 400 that includes a threaded vertical aperture in a location under the clip aperture and in which the clip fastener is threadably receivable in the threaded vertical aperture.

Figure 9:
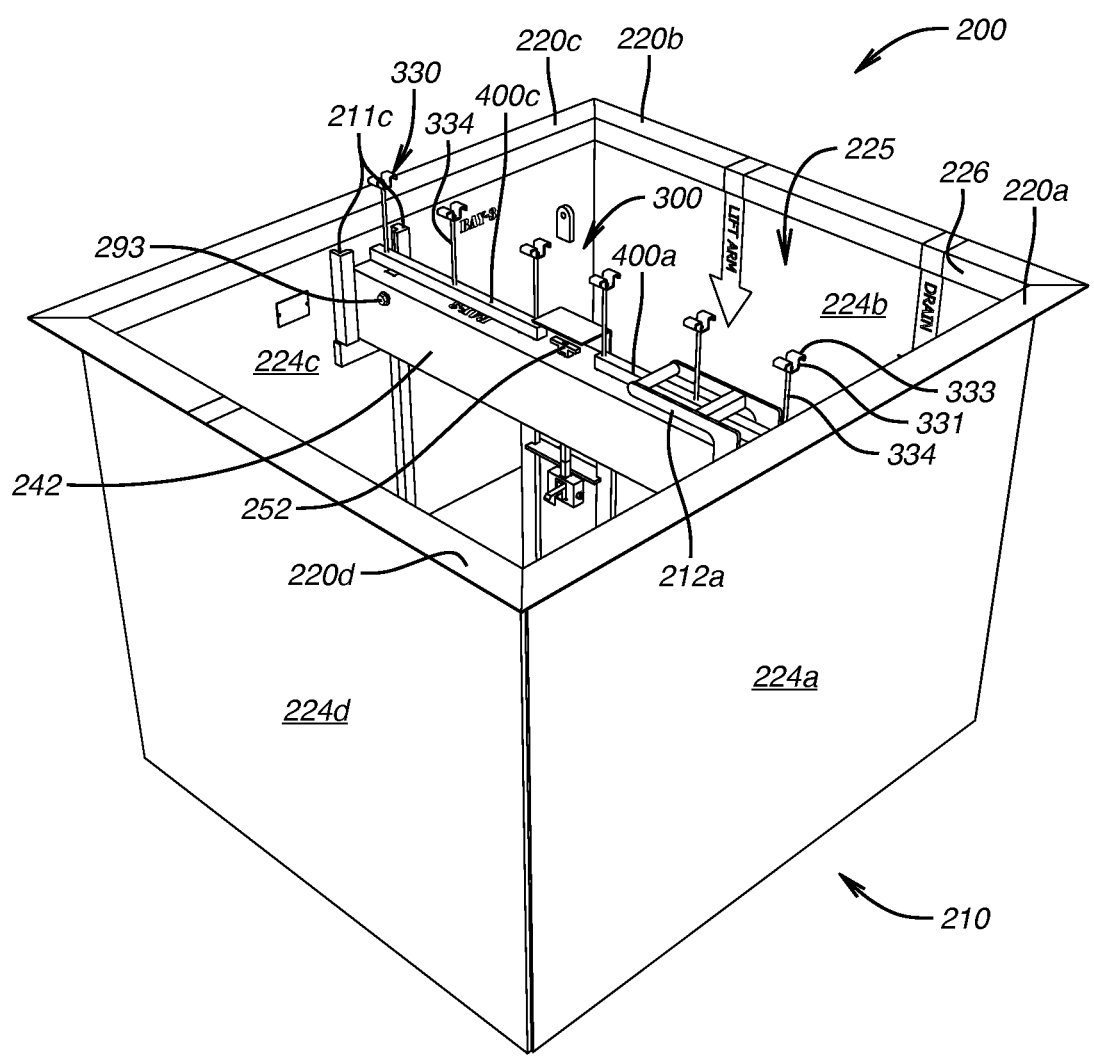
FIG. 9 schematic perspective of another embodiment for securing removable grating sections over a ventilation shaft in which a flood guard of FIGS. 1-3 is installed.

Referring first to FIG. 9 for orientation, such alternative anchoring member embodiment is shown in an environment the same as for the rail and clamp embodiments described above, and identical reference numbers are used for like components as in the rail and clamp embodiments. Handle 212c is removed in order to more clearly see anchoring member bar plate 400c fixed atop beam 242. A second bar plate 400a is fixed atop beam 242 on the opposite side of T-handle grip 252.

Figure 10:
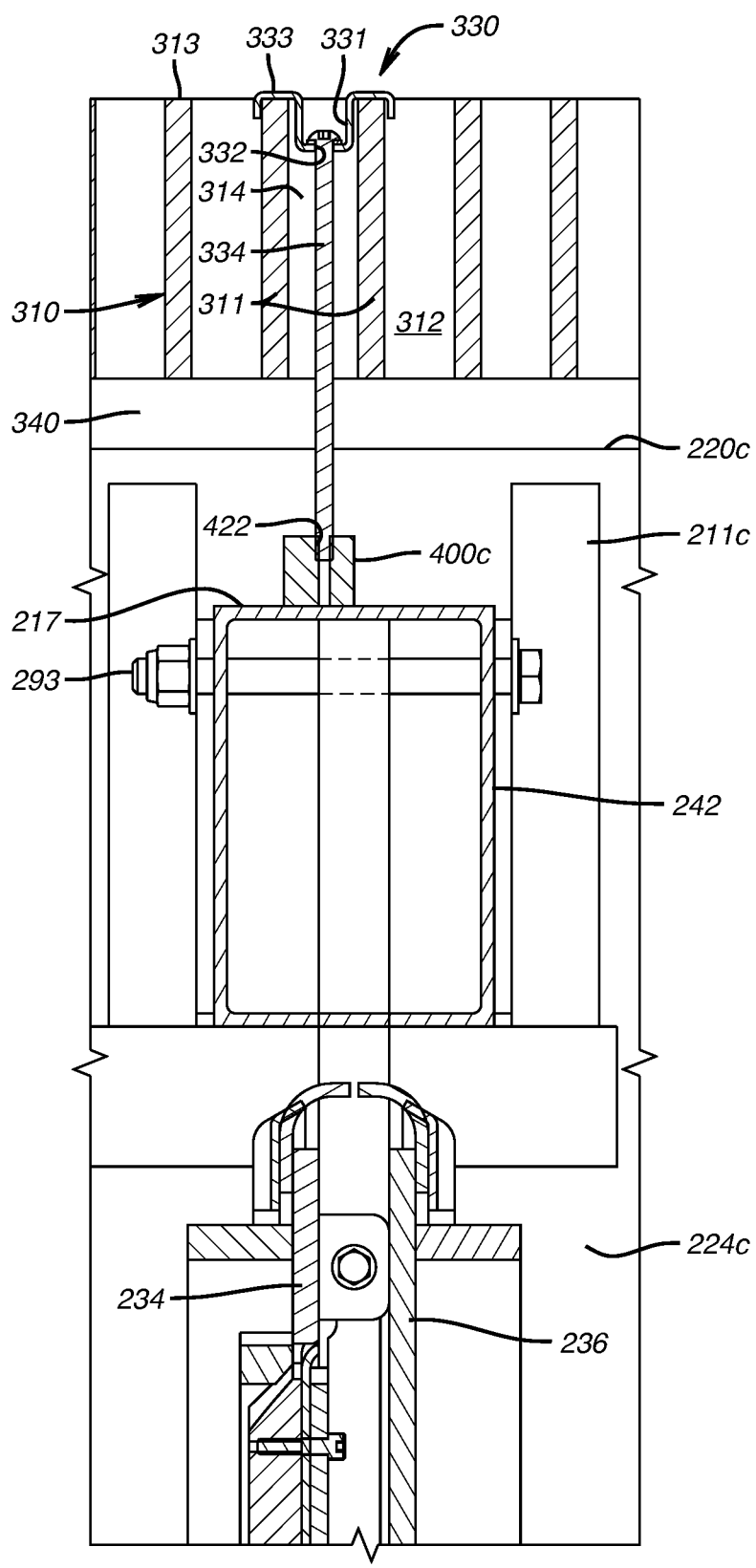
FIG. 10 is an schematic cross section view of the securing apparatus of FIG. 9.

FIG. 10 is a schematic cross section from FIG. 9 taken between the two clips 330 closest to sidewall 224c of support 210. Plate 400c is affixed to the top of beam 242. Grating 310 has been set in place over shim 340 atop flange 220c of flanges 220 hanging support 210 on an embedded ledge 607 (not seen in this view) and a hole 422 has been drilled in bar plate 400c with a drill bit extending through cell opening 314 in grating 310 and hole 422 has been tapped, again through the cell opening 314 in grating 310. A clip 330 the same as used in the embodiments of FIGS. 5-8 is fastened to the drilled and tapped hole 422 by a threaded clip fastener 334 to secure grating 310 to anchoring bar plate 400c. Bar plates 400 thus include a threaded vertical aperture 422 in a location under the clip aperture 332 and clip fastener 334 is threadedly received in threaded vertical aperture 422. Alternatively, plate 400 may not be predrilled and tapped, and clip fastener 334 may be a self drilling screw.

Having described illustrative examples of embodiments that incorporate concepts of the invention, those skilled in the art will be able to use these concepts as guided by these embodiments, and may form alternative variations that nonetheless embrace the concepts herein disclosed and still be within the scope of my invention as claimed in the claims that follow.

The invention claimed is:

1. Apparatus for securing a grating over an atmospheric opening of a ventilation shaft having opposing sides, said grating comprising parallel horizontal load bearing bars and cross bars between and transverse to the load bearing bars that connect the load bearing bars, said bars having a top surface, adjacent load bearing bars and adjacent cross bars defining open air passage cells between them, said apparatus comprising:
   a vertically extending support for arrangement in said shaft comprising horizontal flanges for projecting across a top of at least two opposing sides of said shaft to hang said support in said shaft covered by said grating,
   at least one anchoring member connected to and on top of a beam spanning opposing sides of said support, both the beam and the anchoring member being at a level below said flanges and proximate said atmospheric opening, and
   at least one grating hold-down connecting to the anchoring member to secure said hold-down and said grating to said anchoring member.

2. The apparatus of claim 1 in which said grating hold-down is a clip comprising:
   one or more outwardly extending wing for engaging the top surface of adjacent bearing bars or adjacent cross bars of the grating,
   a vertical aperture adjacent said one or more wings, and
   a fastener insertable into or captive within said aperture of said clip and connecting to said anchoring member to secure said clip and said grating to said anchoring member.

3. The apparatus of claim 2 in which said fastener is a self drilling screw.

4. The apparatus of claim 2 in which said anchoring member includes a threaded vertical aperture in a location under said clip aperture, said fastener being threadably receivable in said vertical aperture.

5. The apparatus of claim 1 in which said anchoring member has a first side and a second side and wherein said apparatus further comprises at least one clamp, said clamp having a moving member securely moveable to press fixedly against said first side of said anchoring member effective to hold said clamp to said anchoring member.

6. The apparatus of claim 5 in which said clamp comprises a base having a first arm extending from said base for placement against said second side of said anchoring member and a second arm extending from said base and having a threaded aperture therein, said moveable member being a threaded fastener having a tip tightenable in said threaded aperture of said second arm to press said tip fixedly against said first side of said anchor effective to hold said clamp to said anchoring member.

7. The apparatus of claim 6 in which said grating hold-down includes a vertical aperture, said base of said clamp includes a threaded upper aperture in an upper side of said clamp, and further comprising a fastener insertable into or captive within said aperture of said grating hold-down and threadingly receivable in said upper aperture of said base.

8. The apparatus of claim 6 in which said grating hold-down includes a vertical aperture and further comprising a self drilling screw fastener insertable into or captive within said aperture of said grating hold-down and fastenable in said base of said clamp.

9. The apparatus of claim 5 in which said anchoring member comprises:
   a rail having a top side, a front side and a backside supported inside said support, and said clamp comprises:
   an inverted U-clamp having a unitary base and pair of spaced arms vertical to said base, a first said arm for arrangement outside said front side of said rail and a second said arm for arrangement outside said backside of said rail with said base straddling over said rail, said base including a threaded vertical aperture and said first arm including a threaded horizontal aperture,
   a threaded fastener for said threaded horizontal aperture of said clamp for insertion and screwing into said threaded horizontal aperture of said first arm to apply tip pressure against said front side of said rail to fix said clamp to said rail,
   and wherein said grating hold-down comprises:
   a clip comprising a recessed central area with a centered vertical aperture and outwardly extending wings for engaging the top surface of adjacent bearing bars or adjacent cross bars of said grating, and
   a threaded fastener for said threaded vertical aperture of said clamp insertable into said centered vertical aperture of said clip for attaching said clip to said clamp to secure said clip and said grating to said rail.

10. The apparatus of claim 9 in which said rail includes a terminal vertical plate transverse to said rail and adjacent said threaded horizontal aperture of said clamp to restrain said threaded fastener for said threaded horizontal aperture from escaping when inserting or removing said fastener into or from said threaded horizontal aperture.

11. The apparatus of claim 9 in which said support comprises quadrilateral sidewalls for arrangement in said shaft defining a passage between top and bottom openings of the support for fluid communication through said support to said atmospheric opening.

12. Apparatus for securing a grating over an atmospheric opening of a ventilation shaft fluidly communicating to an underground ventilation duct, said grating having parallel horizontal load bearing bars and cross bars between and transverse to the load bearing bars that connect adjacent load bearing bars, said bars having a top surface, adjacent load bearing bars and adjacent cross bars defining open air passage cells between them, said apparatus comprising:
   a quadrilateral support comprising opposed lateral sidewalls for arrangement in said shaft defining a passage between top and bottom openings of the support for fluid communication of said ventilation duct up through said support to said atmospheric opening, said support further comprising horizontal flanges transverse to said sidewalls for projecting across a top of said shaft to hang said support in said shaft covered by said grating,
   a beam supported on a pair of opposed lateral sidewalls of said support, said beam having a top side and unobstructively horizontally spanning said passage proximate said top opening at a level below said flanges
   at least one anchoring member connected to said top side of said beam oriented in the direction of said beam and at a level below said flanges, and
   at least one clip for each grating section, each clip comprising
      one or more outwardly extending wings for engaging the top surface of adjacent bearing bars or adjacent cross bars of the grating,
      a vertical aperture adjacent said one or more wings, and a fastener insertable into or captive within said aperture of said clip and connectable to said anchoring member to secure said clip and said grating to said anchoring member.

13. The apparatus of claim 12 in which said anchoring member comprises a vertical rail having a front side and a backside, said apparatus further comprising at least one clamp connecting to said anchoring member, said clamp having a horizontal base, a vertical fastener-receiving aperture in an upper side of said base, a backside arm vertically extending downwardly from said base for placement against said backside of said rail, a front side arm vertically extending downwardly from said base and having a threaded horizontal aperture, and a threaded fastener having a tip tightenable in said threaded horizontal aperture to press fixedly against said front side of said rail.

14. The apparatus of claim 13 in which said threaded fastener for said threaded horizontal aperture of said clamp comprises a threaded set screw.

15. The apparatus of claim 13 in which said vertical aperture in said upper side of said clamp is threaded and said fastener insertable into said vertical aperture of said clip has a head and a threaded shank, said head being of larger diameter than said vertical aperture of the clip, said insertable fastener being receivable in said vertical aperture of said clamp and tightenable to attach said clip to said rail effective to secure said grating section to said rail.

16. A process for securing a grating over a ventilation shaft to an underground ventilation duct fluidly communicating through the ventilation shaft to an atmospheric opening of the shaft, said grating comprising parallel load cross bars and cross bars that connect the load cross bars, said bars having a top surface and defining an open air passage cells between adjacent bars, comprising:
 a) providing
  (1) in said shaft a support comprising horizontal flanges projecting across a top of at least two opposing sides of said shaft to hang said support in said shaft covered by said grating, said support defining a passage between top and bottom openings of the support for fluid communication of said ventilation duct up through said support to said atmospheric opening,
  (2) a beam having ends and a top side, said beam unobstructively horizontally spanning across said passage supported at said ends on opposed sides of said support at a level below said flanges and proximate said top opening,
  (3) at least one vertical rail having a top side and bottom side and a front side and backside, connected at said bottom side to said top side of at least a portion of said beam, and horizontally parallel to said beam,
  (4) a clamp having a threaded horizontal aperture and a threaded vertical aperture,
  (5) a threaded fastener for said threaded horizontal aperture of said clamp,
  (6) a clip comprising a recessed central area with a centered vertical aperture and outwardly extending wings, and
  (7) a threaded fastener for said vertical aperture of said clamp,
 b) identifying at least one cell in said grating section that would be vertically above said rail when said grating section is placed onto said support,
 c) positioning said clamp on the rail so the threaded horizontal aperture is perpendicular to the rail and the vertical threaded aperture is vertically over the rail, steps b) and c) being conducted either (i) step b) before step c), or (ii) step c) before step b),
 d) inserting said threaded fastener for said threaded horizontal aperture of said clamp in said threaded horizontal aperture and tightening it to affix said clamp to said rail,
 e) placing said grating onto said support such that said identified cell of the grating is vertically directly over said vertical aperture of said clamp,
 f) placing said recessed central area of the clip in said identified cell of said grating to engage said outwardly extending wings with the top surface of at least the adjacent cross bars,
 g) determining whether said vertical aperture in said recessed central area of said clip is directly aligned with said vertical aperture of said clamp, and if so, proceeding to step (h), but if not, loosening said clamp and moving it linearly along said rail or transversely to said rail, or both, and refastening said clamp to said rail,
 h) inserting said threaded fastener for said threaded vertical aperture of said clamp into said vertical aperture of said clip and screwing such threaded fastener into said directly aligned vertical aperture of said clamp until the clip secures said grating to said clamp.

17. A process for securing a grating over a ventilation shaft to an underground ventilation duct fluidly communicating through the ventilation shaft to an atmospheric opening of the shaft, said grating comprising parallel load bearing bars and cross bars that connect the load bearing bars, said bars having a top surface and defining a open cell between adjacent bars, wherein a support comprising horizontal flanges projecting across a top of at least two opposing sides of said shaft hangs said support in said shaft covered by said grating, said support defining a passage between top and bottom openings of the support for fluid communication of said ventilation duct up through said support to said atmospheric opening, and wherein a beam having ends and a top side unobstructively horizontally spans across said passage supported at said ends on opposed sides of said support at a level lower than said flanges and proximate said top opening, and wherein at least one vertical rail having a top side and bottom side and a front side and a backside is connected at said bottom side to said top side of at least a portion of said beam horizontally parallel to said beam, said process comprising
 (a) identifying a cell in said grating that would be vertically above said rail when said grating is placed onto said support,
 (b) providing an inverted U-clamp comprising a unitary base and a pair of spaced arms vertical to said base and terminating in ends, a first said arm including a threaded horizontal aperture between said base and the end of said first arm and said base including a threaded vertical aperture between said arms,
 (c) determining a location along a length of said rail that would be vertically directly under said identified cell of said grating when said grating is placed onto said support,
 (d) positioning said inverted U-clamp at said determined place along the length of said rail with said first arm of said U-clamp outside said front side of said rail, with a second arm of said inverted U-clamp outside said backside of said rail, and with said base of the inverted U-clamp straddling said top side of said rail, said ends of said arms moveably supported on said beam, (e) screwing a threaded set screw into said threaded horizontal aperture of said first arm to apply set screw tip pressure against said front side of said rail effective to fix said clamp to said rail, (f) placing said grating onto said support such that said identified cell of the grating section is vertically directly over said vertical aperture of said inverted U-clamp, (g) providing a clip comprising a recessed central area with a centered vertical aperture and outwardly extending wings, (h) placing said recessed central area of said clip in said identified cell of said grating section to engage said outwardly extending wings with the top surface of at least the adjacent load bearing bars, (i) determining whether said vertical aperture in said recessed central area of said clip is directly aligned with said vertical aperture of said base of said inverted U-clamp, and if so, proceeding to step (j), but if not, (1) unscrewing said set screw a few turns to release the tip pressure on said front side of said rail, and (2) either, (A)(x) before or after step (i)(1) selecting a shim of thickness effective to move the vertical aperture of the base of the inverted U-clamp away from the front side of the rail enough to align such vertical aperture directly under the vertical aperture of the clip, (y) after step (i)(1) and step (A)(x) placing said shim between said backside of said rail and said second arm of said inverted U-clamp, and (z) rescrewing said set screw in said threaded horizontal aperture of said first arm to reapply set screw tip pressure against said front side of said rail effective to fix said shimmed clamp to said rail, or (B)(xx) moving said clamp linearly along said rail enough to linearly align such vertical aperture directly under the vertical aperture of the base of the clip, and (yy) rescrewing said set screw in said threaded horizontal aperture of said first arm to reapply set screw tip pressure against said front side of said rail effective to fix said linearly aligned clamp to said rail, or (C) performing a combination of steps (i)(1)(A)(x) and (y) and (i)(1)(B)(xx), and then rescrewing said set screw in said threaded horizontal aperture of said first arm to reapply set screw tip pressure against said front side of said rail effective to fix said shimmed and linearly aligned clamp to said rail, (j) providing a fastening member having a head of larger diameter than said centered vertical aperture of said clip and a threaded shank insertable in said centered vertical aperture of said clip and receivable in said vertical aperture of said base of said clamp, and, (k) inserting said fastening member into said vertical aperture of said clip and screwing said fastening member into said directly aligned vertical aperture of said base of said clamp until the clip secures said grating section to said inverted U-clamp.

18. Apparatus for securing a grating over an atmospheric opening of a ventilation shaft having opposing sides, said grating comprising parallel horizontal load bearing bars and cross bars between and transverse to the load bearing bars that connect the load bearing bars, said bars having a top surface, adjacent load bearing bars and adjacent cross bars defining open air passage cells between them, said apparatus comprising:

a vertically extending support for arrangement in said shaft comprising horizontal flanges for projecting across a top of at least two opposing sides of said shaft to hang said support in said shaft covered by said grating, a beam having a top side and supported by and spanning between a pair of opposed lateral sidewalls of said support at a level below said flanges, at least one anchoring member connected to said top side of said beam, at least one clamp means for clamping to said anchoring member, and at least one grating hold-down connecting to the clamp means to secure said hold-down and said grating to said anchoring member.

\* \* \* \* \*